(12) United States Patent
Yamazaki et al.

(10) Patent No.: US 7,267,808 B2
(45) Date of Patent: Sep. 11, 2007

(54) ALUMINUM NITRIDE POWDER, METHOD FOR PRODUCING THE SAME AND USE THEREOF

(75) Inventors: Masato Yamazaki, Takaishi (JP); Kenshi Mitsuishi, Tokyo (JP); Isao Harada, Shimonoseki (JP); Masao Tanaka, Takaishi (JP); Kohichi Haruta, Takaishi (JP); Koji Watari, Nagoya (JP); Jin-yu Qiu, Nagoya (JP); Yuji Hotta, Nagoya (JP); Kimiyasu Sato, Nagoya (JP)

(73) Assignees: Mitsui Chemicals, Inc., Tokyo (JP); Advanced Industrial Science and Technology, Tokyo (JP)

( * ) Notice: Subject to any disclaimer, the term of this patent is extended or adjusted under 35 U.S.C. 154(b) by 95 days.

(21) Appl. No.: 11/174,723

(22) Filed: Jul. 6, 2005

(65) Prior Publication Data

US 2006/0018818 A1 Jan. 26, 2006

(30) Foreign Application Priority Data

Jul. 8, 2004 (JP) ............................. 2004-202498
Mar. 16, 2005 (JP) ............................. 2005-075540

(51) Int. Cl.
*C01B 21/072* (2006.01)
*C04B 35/581* (2006.01)

(52) U.S. Cl. ...................................... 423/412; 501/98.4
(58) Field of Classification Search ................. 423/412
See application file for complete search history.

(56) References Cited

U.S. PATENT DOCUMENTS 3,979,500 A * 9/1976 Sheppard et al. ........... 423/289

(Continued)

FOREIGN PATENT DOCUMENTS

EP 0 487 728 A1 6/1992

(Continued)

OTHER PUBLICATIONS

*Ceramics Japan*, (32), No. 6 (3 pp), no date.

*Primary Examiner*—Wayne A. Langel
(74) *Attorney, Agent, or Firm*—Buchanan Ingersoll & Rooney PC

(57) ABSTRACT

The present invention is to produce an aluminum nitride powder which is turned into a sintered body at a temperature of not more than 1600° C., thereby obtaining a sintered aluminum nitride in which the density and thermal conductivity are high and which can be properly used as a substrate material.

Using a vapor phase reaction apparatus shown in FIG. 1, ammonia gas was fed from a reactor 2 heated at from 300 to 500° C. and maintained at that temperature by a heating section 1 via a feeding tube 4 while being regulated by a flow regulator 3. At the same time, while being regulated by the flow regulator 5, nitrogen gas containing an organic aluminum compound is fed via a feeding tube 6 to obtain an aluminum nitride powder. The aluminum nitride powder is subjected to a heat treatment at from 1100 to 1500° C. in a reducing gas atmosphere and/or an inert gas atmosphere to obtain an aggregate aluminum nitride powder. The aggregate aluminum nitride powder is subjected to a mechanical treatment to obtain an aluminum nitride powder in which the specific surface area value is not less than 30 m²/g and a ratio of an average particle diameter to a particle diameter in terms of the specific surface area is not more than 10.

15 Claims, 1 Drawing Sheet

U.S. PATENT DOCUMENTS

| | | | |
|---|---|---|---|
| 4,533,645 A * | 8/1985 | Huseby et al. | 501/98.4 |
| 4,547,471 A * | 10/1985 | Huseby et al. | 501/98.4 |
| 4,869,925 A * | 9/1989 | Hiai et al. | 427/96.1 |
| 4,983,462 A | 1/1991 | Hiai et al. | |
| 5,110,575 A * | 5/1992 | Wakimura et al. | 423/412 |
| 5,178,844 A * | 1/1993 | Carter et al. | 423/290 |
| 5,573,742 A * | 11/1996 | Gebhardt | 423/412 |

FOREIGN PATENT DOCUMENTS

| | | |
|---|---|---|
| JP | 63-060102 A | 3/1988 |
| JP | 06-015404 B2 | 3/1994 |
| JP | 06-211577 A | 8/1994 |
| TW | 177325 | 1/1992 |

* cited by examiner

Figure
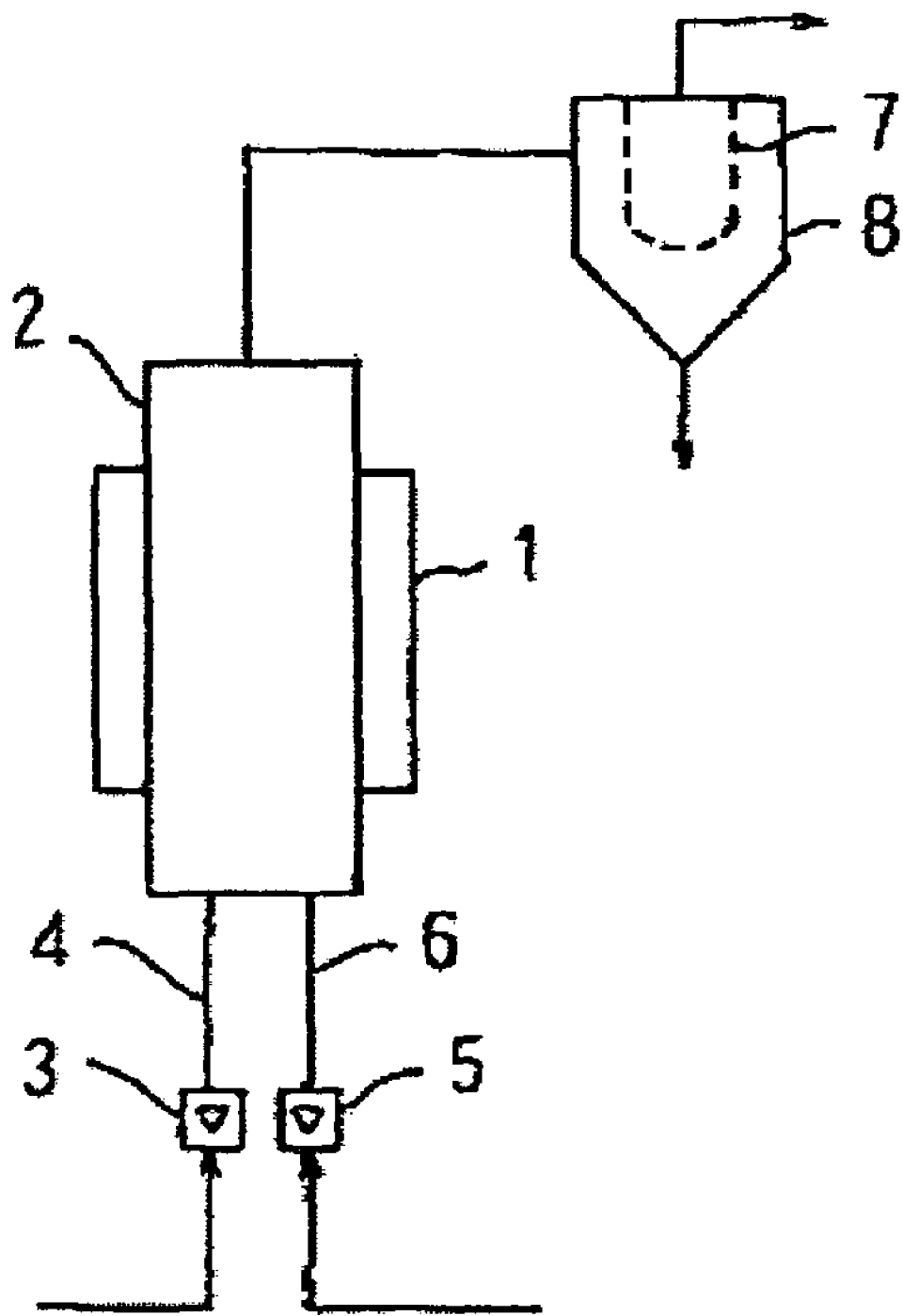

ALUMINUM NITRIDE POWDER, METHOD FOR PRODUCING THE SAME AND USE THEREOF

TECHNICAL FIELD

The present invention relates to an aluminum nitride powder, a method for producing the aluminum nitride powder, a sintered aluminum nitride and a method for producing the sintered aluminum nitride.

BACKGROUND ART

In recent years, with high integration and high output of electronic materials, substrates with high heat radiation (high thermal conductivity) have been in high demand, which can be replacing alumina substrates that have been used thus far. In consideration of the foregoing situation, a sintered body obtained by adding a sintering auxiliary agent such as berylia and the like to silicon carbide, aluminum nitride and the like, and calcining the resulting mixture is said to be a suitable material satisfying the aforementioned demand. In particular, a sintered aluminum nitride has characteristics such as low toxicity, high insulating property and the like so that such a sintered body has been the most paid attention as a high conductive substrate material.

The sintered aluminum nitride is usually produced by calcining an aluminum nitride powder. The physical properties and chemical properties of the aluminum nitride powder as a raw material control very important properties (density, thermal conductivity and the like) in using the obtained sintered body as a high conductive substrate material. Accordingly, several methods for producing an aluminum nitride powder have been studied and proposed.

For example, a method comprising heating a metallic aluminum in a nitrogen atmosphere or an ammonia atmosphere can be cited. However, this method has a drawback in that since the aluminum nitride powder is obtained as a bulk product that is conspicuously consolidated, it cannot be used as a raw material for calcining.

Furthermore, a method comprising mixing an alumina powder with a carbon powder and heating the resulting mixture in a nitrogen atmosphere or an ammonia atmosphere can be cited. However, in this method, the diameter of alumina raw material, the amount of impurities therein and the like have influence on the properties of products so that highly pure alumina with a fine particle diameter is inevitably used, thus resulting in increasing the cost.

Furthermore, a method comprising applying a heat treatment to a reaction product of an organic aluminum compound and amines can be cited. However, in this method, carbon easily remains in the aluminum nitride powder to be obtained and such carbon has a bad influence on the properties of the finally obtained sintered body.

Furthermore, a method comprising reacting ammonia gas with aluminum chloride and/or aluminum bromide gas in a vapor phase can be cited. However, in this method, hydrogen halide gas as a by-product is generated; the generated gas corrodes the apparatus so that a treatment device for discharging the gas out to the reactive system is needed.

Meanwhile, a method comprising mixing organic aluminum compound gas with ammonia gas at not more than 200° C. and carrying out the vapor phase reaction at from 600 to 1300° C. to produce the aluminum nitride powder can be cited (for example, refer to Patent Document 1).

However, the aluminum nitride powder obtained by the foregoing methods including the method described in Patent Document 1 has a hard sintering property as it is that is originally owned by a substance called aluminum nitride. So, there is a drawback in that a calcination temperature of about 2000° C. is needed so that a special calcining furnace is required, resulting in making the cost of the production facilities higher and increasing the amount of energy used for the production.

For this reason, in calcining aluminum nitride, a method comprising adding a sintering auxiliary agent is generally adopted. This method utilizes the fact that the melting point of a complex oxide of a component contained in the sintering auxiliary agent with aluminum is lower than the melting point (not less than 2000° C.) of the aluminum nitride. Namely, the complex oxide of the sintering auxiliary agent generated during calcination is melted to form a liquid phase and the substance movement (a sintering phenomenon) proceeds by way of the liquid phase. Accordingly, for example, when $Y_2O_3$ is used as a sintering auxiliary agent, 1780° C. that is the melting point of a complex oxide of yttrium with aluminum becomes the lower limit of the calcination temperature.

Furthermore, there has been reported that 1600° C. can be the calcination temperature of aluminum nitride by using $LiO_2$—$Y_2O_3$—$CaO$ as a sintering auxiliary agent (for example, refer to Non-patent Document 1). However, the foregoing sintering auxiliary agent is special so that its application might be limited by adding alkali metal species.

On the other hand, the person in the field can naturally conceive an idea of making the particle diameter small in order to enhance the sintering property of an inorganic particle. However, the smaller the particle diameter, the higher the sintering property is. On the other hand, however, the cohesive force is increased so that it is difficult to produce an aluminum nitride powder with a primary particle diameter of not more than sub-micron and having small cohesion at the same time.

Under these circumstances, there has been proposed a method for producing an aluminum nitride powder which can be turned into a sintered body at the calcination temperature of from 1600 to 1700° C. by finely crushing the coarse aluminum nitride powder having an average particle diameter of from 1 to 20 μm, the amount of oxygen of not more than 2 weight % and the amount of metal impurities excluding aluminum in a non-oxidative atmosphere (for example, refer to Patent Document 2). There has been surely described that an aluminum nitride powder which is sinterable at from 1600 to 1700° C. is obtained by the method described in the foregoing document, in Patent Document 2. However, the properties such as the density, thermal conductivity of the obtained sintered body and the like are not described in detail and it is not clear whether the sintered aluminum nitride which can be properly used actually as a substrate material is obtained.

Furthermore, there has been proposed a method for calcining an aluminum nitride ultrafine particle having an average diameter converted from the specific surface area of 0.06 μm with yttrium fluoride, i.e., a low melting point sintering auxiliary agent added thereto at 1500° C. (for example, refer to Patent Document 3). However, in this method, it is required to use a low melting point sintering auxiliary agent.

Furthermore, in the conventional technique, even though the minimum of 1600° C. is needed as the calcination temperature, when the calcination can be made in the temperature range of lower than 1600° C., a special calcining furnace is no longer needed and the sintered body can be produced with much cheaper cost. So, an aluminum nitride powder which enhances the sintering property and can be turned into a sintered body at a lower calcination temperature than in the past is in demand.

Patent Document 1: JP1988-60102A
Non-patent Document 1: Ceramics Japan (32) N. 6 (1997), published by The Ceramic Society of Japan
Patent Document 2: JP1994-015404B
Patent Document 3: JP1994-211577A

DISCLOSURE OF THE INVENTION

An object of the present invention is to provide an aluminum nitride powder which is suitable for producing a sintered aluminum nitride with high density and high thermal conductivity, a method for producing the aluminum nitride powder, and a method for producing a sintered body obtained by using the aluminum nitride powder.

In order to solve the above problem, the present inventors have repeatedly conducted an extensive study and as a result, have succeeded in obtaining an aluminum nitride powder which can be turned into a sintered body at the calcination temperature of not more than 1600° C. Thus, the present invention has been completed.

The present invention relates to an aluminum nitride powder, wherein a primary particle diameter is not more than 0.06 µm and a ratio of a secondary particle diameter to the primary particle diameter (a secondary particle diameter/a primary particle diameter) is not more than 10.

Furthermore, the present invention relates to a method for producing an aluminum nitride powder comprising a synthesis process for obtaining an aluminum nitride powder by subjecting an organic aluminum compound and ammonia to a vapor phase reaction at a temperature of from 300 to 600° C., a crystallization process for obtaining an aggregate aluminum nitride powder by subjecting the aluminum nitride powder obtained in the synthesis process to a heat treatment in a reducing gas atmosphere and/or an inert gas atmosphere at a temperature of from 1100 to 1500° C. for 1 to 6 hours, and a mechanical treatment process for subjecting the aggregate aluminum nitride powder obtained in the crystallization process to a mechanical treatment.

Furthermore, the present invention relates to a method for producing a sintered aluminum nitride, wherein an aluminum nitride powder is calcined in the presence of any one of the foregoing aluminum nitride powders.

BRIEF DESCRIPTION OF THE DRAWINGS

The Figure is a schematic flow diagram of a vapor phase reaction reactor used for producing the aluminum nitride powder of the present invention.

Meaning of symbols in the drawing is as follows: 1, heating section; 2, reactor; 3, flow regulator; 4, feeding tube; 5, flow regulator; 6, feeding tube; 7, filter; and 8, collector.

BEST MODE FOR CARRYING OUT THE INVENTION

[Aluminum Nitride Powder]

The aluminum nitride powder of the present invention has the specific surface area value of not less than 30 m$^2$/g and preferably from 30 to 150 m$^2$/g, and a ratio of an average particle diameter to a particle diameter in terms of the specific surface area (an average particle diameter/a particle diameter in terms of the specific surface area) of not more than 10 and preferably from 1 to 10.

The aluminum nitride powder of the present invention has the primary particle diameter of not more than 0.06 µm and preferably from 0.012 to 0.06 µm, and a ratio of a secondary particle diameter to a primary particle diameter (a secondary particle diameter/a primary particle diameter) of not more than 10 and preferably from 1 to 10.

When the primary particle diameter and the secondary particle diameter fail to satisfy the above relationship, the effect of the present invention is not achieved in some cases. Further, the specific surface area in the present invention means the BET specific surface area. Meanwhile, the primary particle diameter was calculated from the measured BET specific surface area value according to the following formula.

$$\text{Primary particle diameter (µm)} = 6 \div [\text{Specific surface area value (m}^2/\text{g)}] \div 3.26 \qquad (1)$$

Meanwhile, the secondary particle diameter in the present invention is obtained by the laser-beam diffraction method.

The aluminum nitride having these properties is turned into a sintered body having a density of not less than 98% of the theoretical density by calcination under an atmospheric pressure and at a temperature of from 1400 to 1600° C.

[Method for Producing an Aluminum Nitride Powder]

The production method of the present invention comprises a synthesis process for obtaining an aluminum nitride powder by subjecting an organic aluminum compound and ammonia to a vapor phase reaction at a temperature of not less than 300 and not more than 600° C., a crystallization process for obtaining an aggregate aluminum nitride powder by subjecting the aluminum nitride powder obtained in the synthesis process to a heat treatment in a reducing gas atmosphere and/or an inert gas atmosphere at a temperature of from 1100 to 1500° C. for 1 to 6 hours, and a mechanical treatment process for subjecting the aggregate aluminum nitride powder obtained in the crystallization process to a mechanical treatment.

(Synthesis Process)

The synthesis process is a process for obtaining an aluminum nitride powder by subjecting an organic aluminum compound and ammonia to a vapor phase reaction at from 300 to 600° C., using the organic aluminum compound and ammonia as raw materials.

Organic aluminum compounds can be used without particular restrictions as far as they can represent a vapor phase or a liquid phase. Of the compound, trialkyl aluminum and dialkyl aluminum halide are preferable. More specifically, there can be exemplified, for example, trimethyl aluminum, triethyl aluminum, triisobutyl aluminum, dimethyl aluminum halide, diethyl aluminum halide, diisobutyl aluminum halide and the like. Organic aluminum compounds can be used singly or in combination of two or more kinds. The organic aluminum compound is fed to the reactive system in a vapor phase or a liquid phase. When it is fed in a liquid phase, the stability of the reaction is disturbed by the latent heat of vaporization of the aforementioned compounds in some cases and therefore it is preferably fed in a vapor phase. As a method of feeding in a vapor phase, a method for heating and evaporating an organic aluminum compound, a method for feeding an organic aluminum compound accompanying with non-oxidizing gas such as nitrogen, hydrogen, argon, helium and the like can be cited.

Ammonia can be fed to the reactive system in a liquid phase or a vapor phase. However, for the reason described above, it is preferably fed in a vapor phase.

The ratio of the organic aluminum compound to ammonia is not particularly restricted and it is preferable to properly select the ratio in consideration of the particle diameter of the obtained aluminum nitride powder within a range of not less than 1 mole of ammonia, based on 1 mole of the organic aluminum compound.

When the reaction temperature of the organic aluminum compound and ammonia is less than 300° C., an unreacted organic aluminum compound remains in the aluminum nitride powder, which has a bad influence on the properties of the finally obtained sintered body in some cases. When it exceeds 600° C., an organic aluminum compound-derived alkyl group is graphitized, which has a bad influence on the properties of the finally obtained sintered body in some cases.

As a reactor used for the vapor phase reaction in the synthesis process, known vessels for a vapor phase reaction can be used. Examples thereof include a vertical tubular reactor, a horizontal tubular reactor and the like.

(Crystallization Process)

The crystallization process is a process for obtaining an aggregate aluminum nitride powder by subjecting the aluminum nitride powder obtained in the synthesis process to a heat treatment in a reducing gas atmosphere and/or an inert gas atmosphere at a temperature of not less than 1100° C. and not more than 1500° C. for 1 to 6 hours.

As the reducing gas atmosphere and inert gas atmosphere, known atmospheres can be used. Concrete examples thereof include ammonia, hydrogen, nitrogen, argon, helium and the like can be cited. These atmospheres can be used singly or in combination of two or more kinds.

The temperature for a heat treatment determines the primary particle diameter of the aggregate aluminum nitride powder obtained by the heat treatment. The heat treatment is preferably carried out at a temperature as low as possible, which is, however, required to compromise with the side effect of removing carbon in the aluminum nitride powder obtained in the vapor phase synthesis. Accordingly, the temperature for a heat treatment is from 1100 to 1500° C. in the present invention.

Furthermore, the temperature for a heat treatment is a factor to determine the primary particle diameter. When the heat treatment is carried out for a long time, the primary particle diameter becomes extremely large. When the temperature for a heat treatment is from 1100 to 1500° C., an aggregate aluminum nitride powder having a preferred primary particle diameter can be obtained by calcination for 1 to 6 hours.

It is preferable that the aggregate aluminum nitride powder obtained by the heat treatment has the specific surface area value of not less than 5 $m^2/g$. Since the primary particle diameter after the mechanical treatment is in the proper range, excessive crushing energy is not needed.

(Mechanical Treatment Process)

In order to control the dispersability of the finally obtained aluminum nitride powder, the mechanical treatment process is a process for crushing the aggregate aluminum nitride powder obtained in the crystallization process and regulating the ratio of the secondary particle diameter to the primary particle diameter of the generated aluminum nitride particle to not more than 10.

Furthermore, this process plays a secondary role of improving the moldability and sintering property by reducing cohesion of the powder.

Herein, to crush the aggregate aluminum nitride powder, crushers which have been used for crushing inorganic powder from the past can be used. A wet mill crushing using a ball medium having a small diameter of 3 mm$\phi$ and preferably 1 mm$\phi$ is preferable. Furthermore, crushing is preferably carried out in an inert gas atmosphere lest that the aluminum nitride powder is not actually oxidized in the course of crushing. The crushing conditions are properly selected according to the properties of the aggregate aluminum nitride powder, the type of the crusher and the like.

In this process, before or after the crushing of the aggregate aluminum nitride powder, a known sintering auxiliary agent for producing a sintered aluminum nitride such as $Y_2O_3$ and the like can be added. The amount to be added is not particularly restricted, but it is preferably from 0.1 to 10 weight parts, based on 100 weight parts of the aggregate aluminum nitride powder. Accordingly, the sinterable temperature is not only decreased, but grain growth of the sintered body is accelerated, thereby resulting in obtaining an effect of increasing the thermal conductivity of the sintered body.

According to this process, slurry of the aluminum nitride powder can be obtained. The slurry can be used for producing a sintered body as it is or may be used for producing a sintered body by separating the aluminum nitride powder from the foregoing slurry and drying.

When the aluminum nitride powder obtained in this process is used, a sintered aluminum nitride can be obtained, which can then be properly used as a substrate material at the lower calcination temperature than 1600° C. without adding a sintering auxiliary agent.

Even though it is not clear how the aluminum nitride powder having such sintering property is obtained, the reason is considered as follows. In the present invention, it is considered that, by carrying out a vapor phase reaction of the organic aluminum compound and ammonia, crystallization and crushing in sequence, the primary particle diameter is fine and the cohesion is very small, thereby obtaining an aluminum nitride powder having high surface energy. By reducing the particle diameter to the limit, surface energy of the crushed powder is considered to be higher. Furthermore, another reason is assumed that since the internal pore of the aggregate which easily remains in the course of calcining is small, no pore remains in the final stage of calcination. As a result, it is considered that the calcination at a temperature of not more than 1600° C. can be carried out without using any sintering auxiliary agent.

(Sintered Aluminum Nitride)

The sintered aluminum nitride of the present invention can be obtained by calcining the aluminum nitride powder obtained as described above at a temperature of from 1400 to 1600° C. in an inert atmosphere including nitrogen, argon and the like.

The ratio of the density of the sintered aluminum nitride to the theoretical density is not less than 98% in the present invention.

When the calcination temperature is less than 1400° C., the density of the sintered body becomes extremely lowered so that the sintered body cannot be properly used as a substrate material in some cases.

Furthermore, in the method for producing the sintered aluminum nitride of the present invention, the aluminum nitride of the present invention may be added to the aluminum nitride powder as a sintering accelerator and mixed therewith for calcining, whereby a sintered aluminum nitride is produced.

The aluminum nitride powder used herein is not particularly restricted and those produced by the known methods such as a direct nitridation method, a reduction nitridation method and the like can be used. However, considering that the sintering property (the sintering property at a low temperature), the properties of the obtained sintered body (particularly the thermal conductivity) and the like are improved, an aluminum nitride powder having an average particle diameter of from 1 to 5 μm and the content of oxygen of not more than 2 weight % is preferable.

The content of the sintering accelerator for an aluminum nitride added is not particularly restricted and may be properly selected from a wide range according to various conditions such as the specific surface area value, the ratio (an average particle diameter/a particle diameter in terms of the specific surface area), the particle size distribution or an average particle diameter of the aluminum nitride powder, purity, calcination temperature of the aluminum nitride powder, and the like. It is preferably from 0.1 to 50 weight parts and more preferably from 0.1 to 5 weight parts, based on 100 weight parts of the aluminum nitride powder.

In the calcination, a sintering auxiliary agent may be used or may not be used. As the sintering auxiliary agent, those usually used in the field can be used. Examples thereof include $Y_2O_3$, CaO and the like. The sintering auxiliary agent can be used singly or in combination of two or more kinds. When a sintering auxiliary agent is added, the low-temperature sintering property or thermal conductivity of the obtained sintered body is further improved. Since the aluminum nitride powder with good dispersability in the present invention can be closely mixed with a sintering auxiliary agent, it preferably affects the invention.

EXAMPLES

The present invention is now more specifically illustrated below with reference to Examples and Comparative Examples. Here, the specific surface area was measured using a flow type surface analysis apparatus (FlowSorb II2300 type, manufactured by Shimadzu Corporation). Further, the secondary particle diameter was measured by a laser diffraction analyzer (product name: SALDA2000, manufactured by Shimadzu Corporation).

Example 1

Using a vapor phase reaction apparatus shown in the Figure, ammonia gas was fed from the lower part of a reactor 2 heated at 500° C. and maintained at that temperature by a heating section 1 via a feeding tube 4 while being regulated by a flow regulator 3. At the same time, while being regulated by a flow regulator 5, triethyl aluminum accompanying with nitrogen gas via the feeding tube 6 was fed. By regulating the flow rate in the flow regulators 3 and 5, reactive gas was arranged to stay in the heating zone (reactive zone) for 2 seconds. Further, the molar ratio of ammonia to triethyl aluminum (ammonia/triethyl aluminum) was 20.

The aluminum nitride powder generated at the reactive zone was taken out of the upper part of the reactor 2 along with unreacted gas, separated from gas by a filter 7 and then collected to a collector 8. The collected aluminum nitride powder was put into a graphite crucible, and subjected to a heat treatment at 1300° C. for 3 hours while flowing nitrogen gas in an electric furnace to obtain an aggregate aluminum nitride powder of white fine powder. The specific surface area of the aforementioned powder was 10.2 $m^2/g$ and the amount of oxygen in the powder measured by a Nitrogen/Oxygen Determinator (LECO Corporation, TC-436) was 1.1 weight %.

100 g of the powder was put in ethanol of a dispersion medium and the resulting material was subjected to a wet mixture for an hour using a ball mill (product name: Super Apex Mill, manufactured by Kotobuki Industries Co., Ltd.) for dispersion. Zirconia balls of not more than 1 mmφ were used as a crushing medium. The obtained slurry was dried to obtain an aluminum nitride powder. The specific surface area of the powder was 70 $m^2/g$ and the primary particle diameter converted therefrom was 0.026 μm. Furthermore, the secondary particle diameter was 0.2 μm. The ratio of the secondary particle diameter to the primary particle diameter (hereinafter referred to as the cohesion) was 7.7.

The thus-obtained aluminum nitride powder was molded in a disc plate of 20 mmφ under a pressure of 1000 $kg/cm^2$ and calcined in a nitrogen flow at 1500° C. for 3 hours in a graphite furnace according to the usual method. The obtained sintered body was ground at a diameter of 10 mm and a thickness of 3 mm, and the density was measured according to the Archimedian method while the thermal conductivity was measured according to the laser flash method. The density of the sintered body was 3.22 $g/cm^3$, the ratio to the theoretical density was 98.8% and the thermal conductivity was 75 W/mk.

Example 2

An aluminum nitride powder was calcined in the same manner as in Example 1, except that 3 weight parts of $Y_2O_3$ was added as a sintering auxiliary agent, based on 100 weight parts of the aluminum nitride, after the ball mill crushing. The density of the sintered body was 3.29 $g/cm^3$, the ratio to the theoretical density (an amended value of the added $Y_2O_3$) was 99.4% and the thermal conductivity was 110 W/mK.

Example 3

An aluminum nitride powder was synthesized in the same manner as in Example 2, except that the temperature for a heat treatment was 1400° C. and zirconia balls of 0.5 mmφ were used as a ball medium for mill crushing. The specific surface area of the powder after the heat treatment was 8.2 $m^2/g$. The specific surface area after crushing was 33 $m^2/g$ and the primary particle diameter converted therefrom was 0.056 μm. Further, the secondary particle diameter was 0.5 μm. According to this, the cohesion was 8.9. The density of the obtained sintered body was 3.25 and the ratio to the theoretical density was 98.2%. Further, the thermal conductivity was 113 W/mK.

Example 4

An aluminum nitride powder was synthesized in the same manner as in Example 2, except that zirconia balls of 3 mmφ were used as a ball medium for mill crushing. The specific surface area after crushing was 31 $m^2/g$ and the primary particle diameter converted therefrom was 0.059 μm. Further, the secondary particle diameter was 0.3 μm. According to this, the cohesion was 5.1. The density of the obtained sintered body was 3.26 and the ratio to the theoretical density was 98.5%. Further, the thermal conductivity was 115 W/mK.

Comparative Example 1

An aluminum nitride powder was synthesized in the same manner as in Example 1, except that a temperature for a heat treatment was 1700° C. The specific surface area of the powder was 3.0 m²/g and the primary particle diameter converted therefrom was 0.613 µm. The secondary particle diameter was 0.8 µm and the cohesion was 1.3. The amount of oxygen was 0.4 weight %. The density of the sintered body produced in the same manner as in Example 1 using the powder was 2.60 g/cm³, which was kept at a low value as compared to the theoretical density (3.26).

Comparative Example 2

The aluminum nitride powder which was heat-treated at 1300° C. as in Example 1 was put into a resin pot and ethanol was added thereto as a dispersion medium. And the resulting material was crushed for 40 hours using nylon balls (10 mmφ) with an iron core inserted thereinto by ball milling. The specific surface area of the obtained crushed powder was 10.3 m²/g and the primary particle diameter converted therefrom was 0.179 µm. The secondary particle diameter was 1.2 µm and the cohesion was 6.7. The density of the sintered body produced in the same manner as in Example 1 using the crushed powder was 2.73 g/cm³.

Comparative Example 3

The specific surface area of the obtained aluminum nitride powder at a temperature for a heat treatment of 850° C. was 68 m²/g and the primary particle diameter converted therefrom was 0.027 µm. The secondary particle diameter was 1.2 µm and the cohesion was 44.4. The amount of oxygen was 1.3 weight %. The density of the sintered body produced in the same manner as in Example 1 using the powder was 2.85 g/cm³.

Comparative Example 4

The specific surface area of the obtained aluminum nitride powder at a temperature for a heat treatment of 1050° C. was 30 m²/g. The treatment was carried out in the same manner as in Example 1, except that the wet mixing treatment time was 15 minutes. The specific surface area of the obtained powder was 49 m²/g and the primary particle diameter converted therefrom was 0.038 µm. Further, the secondary particle diameter was 0.56 µm and the cohesion was 14.7. The density of the sintered body produced by using the powder was 2.94 g/cm³.

Example 5

[Production of a Sintering Raw Material (Aluminum Nitride Powder)]
3.53 g of $Y_2O_3$ and 2.0 g of CaO were added to 100 g of an aluminum nitride powder (product name: MAN-2, average particle diameter: 1.8 µm, manufactured by Mitsui Chemicals, Inc.) as sintering auxiliary agents and mixed therewith to prepare a sintering raw material A.
[Production of a Sintered Aluminum Nitride]
1.89 g of the sintering accelerator for an aluminum nitride obtained in Example 1 was added to 100 g of the sintering raw material A and mixed therewith. The resulting mixture was molded in a disc plate of 20 mmφ under a pressure of 1000 kg/cm² and calcined in a graphite furnace in a nitrogen flow at 1600° C. for 3 hours. The obtained sintered body was ground at a diameter of 10 mm and a thickness of 3 mm, and the density was measured according to the Archimedian method while the thermal conductivity was measured according to the laser flash method. The sintered body has the density of 3.28 g/cm³ and the thermal conductivity of 133 W/m·k.

Example 6

A sintered body was obtained in the same manner as in Example 5, except that the amount of a sintering accelerator for an aluminum nitride added was changed to 50 g. The sintered body was ground at a diameter of 10 mm and a thickness of 3 mm, and the density was measured according to the Archimedian method while the thermal conductivity was measured according to the laser flash method. The sintered body has the density of 3.28 g/cm³ and the thermal conductivity of 87 W/m·k.

Comparative Example 5

The aluminum nitride powder which was heat-treated at 1300° C. as in Example 1 was put into a resin pot and ethanol was added thereto as a dispersion medium. And the resulting material was crushed for 40 hours using nylon balls (10 mmφ) with an iron core inserted thereinto by ball milling. The specific surface area of the obtained crushed powder was 10.3 m²/g and an average particle diameter was 1.2 µm (cohesion=6.7). The sintered body produced in the same manner as in Example 5 except for adding 2.0 g of the crushed powder used as a sintering accelerator for an aluminum nitride to the sintering raw material A has the density of 2.73 g/cm³ and the thermal conductivity of 52 W/m·k.

Comparative Example 6

The specific surface area of the aluminum nitride powder obtained in the same manner as in Example 5 except for a temperature for a heat treatment of 850° C. was 68 m²/g, an average particle diameter was 1.2 µm (cohesion=44) and the amount of oxygen was 1.3 weight %. The density of the sintered body produced in the same manner as in Example 5 except for adding 2.0 g of the powder used as a sintering accelerator for an aluminum nitride to the sintering raw material A was 2.85 g/cm³.

Comparative Example 7

The sintered body produced in the same manner as in Example 5 using the sintering raw material A alone has the density of 2.78 g/cm³ and the thermal conductivity of 52 W/m·k.

EFFECT OF THE INVENTION

According to the present invention, an aluminum nitride powder capable of obtaining a sintered aluminum nitride without using a sintering auxiliary agent by calcination at a temperature from 100 to 200° C. lower than the conventional minimum calcination temperature of the aluminum nitride of 1600° C. Accordingly, a special electric furnace such as a carbon resistant furnace or the like is not needed and the amount of energy required for calcination of aluminum nitride can be reduced. So, a sintered aluminum nitride can be produced very favorably on industrial scale.

The invention claimed is:
1. An aluminum nitride powder, wherein a primary particle diameter is not more than 0.06 µm and a ratio of a secondary particle diameter to the primary particle diameter (a secondary particle diameter/a primary particle diameter) is not more than 10.

2. The aluminum nitride powder according to claim 1, wherein the primary particle diameter is from 0.012 to 0.06 µm and a ratio of the secondary particle diameter to the primary particle diameter (a secondary particle diameter/a primary particle diameter) is from 1 to 10.

3. The aluminum nitride powder according to claim 1, wherein the aluminum nitride powder is turned into a sintered body having a density of not less than 98% of a theoretical density by calcination under an atmospheric pressure and at a temperature of from 1400 to 1600° C.

4. The aluminum nitride powder according to claim 2, wherein the aluminum nitride powder is turned into a sintered body having a density of not less than 98% of a theoretical density by calcination under an atmospheric pressure and at a temperature of from 1400 to 1600° C.

5. A method for producing an aluminum nitride powder comprising a synthesis process for obtaining an aluminum nitride powder by subjecting an organic aluminum compound and ammonia to a vapor phase reaction at a temperature of from 300 to 600° C.; a crystallization process for obtaining an aggregate aluminum nitride powder by subjecting the aluminum nitride powder obtained in the synthesis process to a heat treatment in a reducing gas atmosphere and/or an inert gas atmosphere at a temperature of from 1100 to 1500° C. for 1 to 6 hours; and a mechanical treatment process for subjecting the aggregate aluminum nitride powder obtained in the crystallization process to a mechanical treatment, wherein the mechanical treatment process comprises subjecting the aggregate aluminum nitride powder to a wet mill crushing using a ball medium having a small diameter of not more than 3 mm$\phi$.

6. The method for producing an aluminum nitride powder according to claim 5, wherein the specific surface area value of the aggregate aluminum nitride powder obtained in the crystallization process is not less than 5 $m^2/g$.

7. The method for producing an aluminum nitride powder according to claim 5, wherein, before or after the aggregate aluminum nitride powder is subjected to the mechanical treatment in the mechanical treatment process, a sintering auxiliary agent is added to the aggregate powder and mixed therewith.

8. A method for producing a sintered aluminum nitride comprising:
providing a first material composed of an aluminum nitride powder which is a raw material and a second material composed of the aluminum nitride powder according to claim 1 which is a sintering auxiliary agent;
mixing the first material and the second material; and
calcining the mixture of the first material and the second material.

9. The method for producing a sintered aluminum nitride according to claim 8, wherein the calcination temperature is from 1400 to 1600° C.

10. The method for producing a sintered aluminum nitride according to claim 8, wherein the amount of the second material added is in the range of 0.1 to 50 parts by weight with respect to 100 parts by weight of the first material.

11. The method for producing a sintered aluminum nitride according to claim 8, wherein the amount of the second material added is in the range of 0.1 to 5 parts by weight with respect to 100 parts by weight of the first material.

12. A method for producing a sintered aluminum nitride comprising:
providing a first material composed of an aluminum nitride powder which is a raw material and a second material composed of the aluminum nitride powder according to claim 4 which is a sintering auxiliary agent;
mixing the first material and the second material; and
calcining a mixture of the first material and the second material.

13. The method for producing a sintered aluminum nitride according to claim 12 wherein the calcination temperature is from 1400 to 1600° C.

14. The method for producing a sintered aluminum nitride according to claim 12, wherein the amount of the second material added is in the range of 0.1 to 50 parts by weight with respect to 100 parts by weight of the first material.

15. The method for producing a sintered aluminum nitride according to claim 12, wherein the amount of the second material added is in the range of 0.1 to 5 parts by weight with respect to 100 parts by weight of the first material.

* * * * *

UNITED STATES PATENT AND TRADEMARK OFFICE
CERTIFICATE OF CORRECTION

| | | |
|---|---|---|
| PATENT NO. | : 7,267,808 B2 | Page 1 of 1 |
| APPLICATION NO. | : 11/174723 | |
| DATED | : September 11, 2007 | |
| INVENTOR(S) | : Masato Yamazaki et al. | |

It is certified that error appears in the above-identified patent and that said Letters Patent is hereby corrected as shown below:

Title Page,

Section 73 (Assignee): Please correct the name of the second Assignee to read:

--National Institute of-- Advanced Industrial Science and Technology

Signed and Sealed this

Ninth Day of November, 2010

David J. Kappos
*Director of the United States Patent and Trademark Office*